United States Patent Office 3,439,158
Patented Apr. 15, 1969

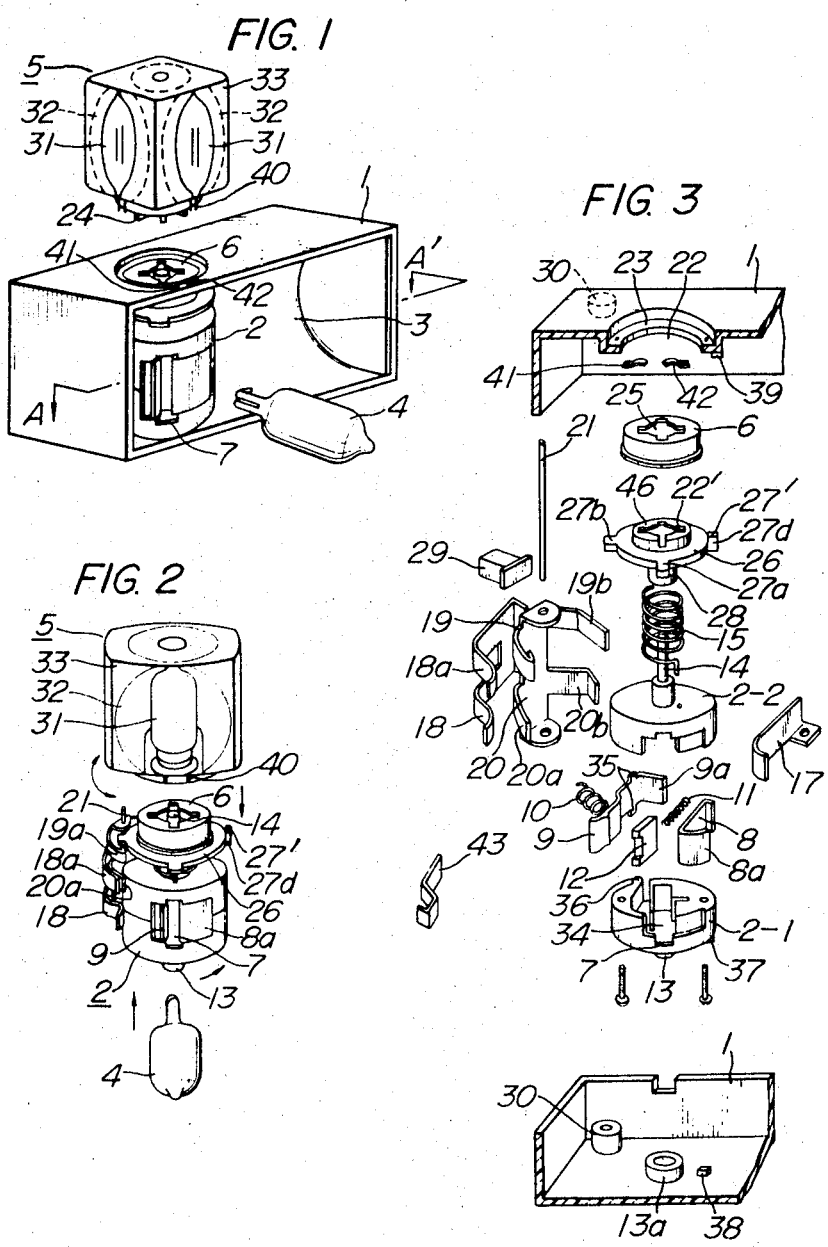

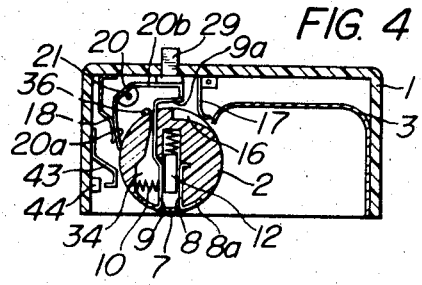
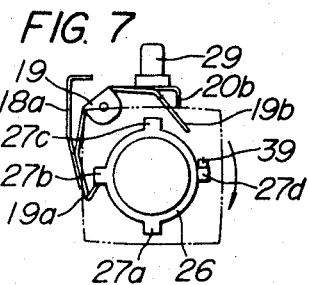
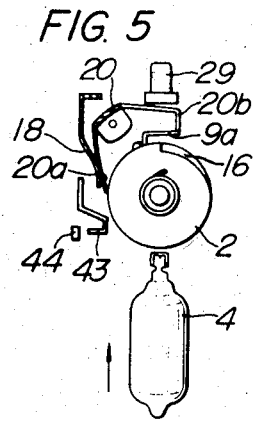
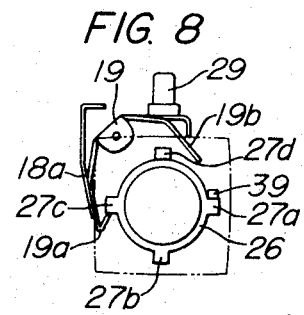
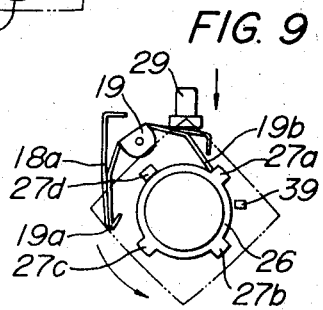
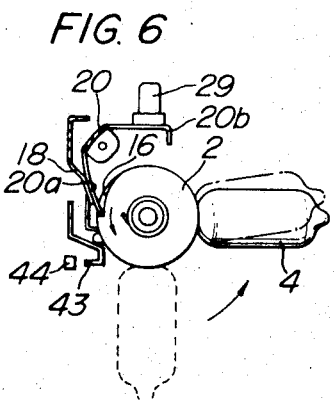
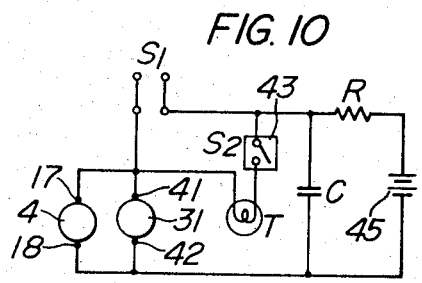

3,439,158
FLASH LIGHTING APPARATUS FOR PHOTOGRAPHY
Yasunori Sawada, Osaka, Japan, assignor to West Electric Co., Ltd., Osaka, Japan, a corporation of Japan
Filed Nov. 21, 1966, Ser. No. 595,791
Claims priority, application Japan, Nov. 24, 1965, 40/73,075, 40/73,076, 40/73,077, 40/73,078, 40/73,079, 40/73,080
Int. Cl. G03b 15/05
U.S. Cl. 240—1.3      5 Claims This invention relates to flash lighting apparatus for photography which are operable with both a multi-flashing photoflash lamp unit or a flash cube and a single-flashing photoflash lamp, and has for its object to provide an entirely novel apparatus of the type described above having such a structure that a flash cube mounted thereon can be successively rotated through a predetermined angle each time a push button is manipulated so that new photoflash lamps can be successively directed toward a predetermined direction and an economically advantageous single-flashing photoflash lamp can also be used if so desired.

Recently a multi-flashing photoflash lamp unit or a flash cube having a plurality of photoflash lamps and reflecting plates disposed on a plurality of faces has been developed and is gradually replacing the single-flashing photoflash lamp. The conventional single-flashing photoflash lamp has been inconvenient in that it is mounted on a flash lighting apparatus each time a flash is required, is then discarded after the flash, and another new photoflash lamp is mounted to prepare for a subsequent flash. The flash cube has been developed in order to eliminate the above inconvenience.

The flash cube is advantageous in that it can be used a plurality of times for taking photographs once it is mounted on a flash lighting apparatus, thus eliminating the trouble of exchange of photoflash lamps, and in that the flash lighting apparatus itself can be made to a small size since the photoflash lamps are formed integrally with the reflecting plates. The flash cube, however, is not suitable for common use due to its high price and is quite uneconomical in that the price of one photoflash lamp in the flash cube is two to three times as much as the price of a conventional photoflash lamp. It has therefore been difficult from an economical aspect to always use such a costly flash cube.

With the above drawback of the flash cube taken into consideration, it is an object of the present invention to provide a flash lighting apparatus for photography which is so constructed as to permit simultaneous mounting of a costly but easily operable flash cube and an economical single-flashing photoflash lamp and to also permit simple and easy mounting of small-sized photoflash lamps of, for example, type AG–1 which are most commonly used in photography.

The above and other objects, advantages and features of the present invention will become apparent from the following description with reference to the accompanying drawings, in which:

FIG. 1 is a perspective view of the flash lighting apparatus embodying the present invention;

FIG. 2 is a perspective view of a lamp receiving socket section of the apparatus;

FIG. 3 is an exploded perspective view of the lamp receiving socket section;

FIG. 4 is a sectional view taken on the line A—A in FIG. 1;

FIGS. 5 to 9 are schematic explanatory views showing the manner of operation of the flash lighting apparatus; and FIG. 10 is an electrical circuit diagram of the flash lighting apparatus.

Briefly the apparatus according to the invention has a shape as shown in FIG. 1 and comprises a box-like body or casing 1 which is molded from an electrically insulating material such as a synthetic resin and has an open end. A socket structure 2 for mounting a single-flashing photoflash lamp thereon is rotatably disposed at a part in the opening of the casing 1, and a reflecting plate 3 is disposed at another part on the sufficiently rear side in the opening of the casing 1 to form a means for giving a flash of light in cooperation with a photoflash lamp 4. On the upper surface portion near one end of the casing 1 in which the photoflash lamp mounting socket structure 2 is rotatably disposed, there is provided a rotary mounting structure 6 for mounting thereon a flash cube 5.

Referring more specifically to the drawings, the socket structure 2 for mounting the photoflash lamp 4 thereon is substantially shaped as a cylinder consisting of two molded bodies 2–1 and 2–2, as best shown in FIG. 3. A socket 7 is formed on a part of the outer peripheral face of the socket structure 2 to receive therein the photoflash lamp 4, and is arranged to communicate with a bore 34 penetrating the socket structure 2 in its diametral direction. On both sides of the bore 34 communicating with the socket 7, there are provided a pair of opposite contact members 8 and 9. A front extension 8a of the contact member 8 extends outwardly of the socket structure 2 and is bent along the outer peripheral face of the socket structure 2 to serve as a switch-over contact. Lugs 35 acting as pivot pins are suitably provided on the rear end of the other contact member 9 so that the contact member 9 can make pivotal movement in the bore 34. That end of the contact member 9 which is disposed adjacent to the open end of the socket 7 is abutted by a resilient member 10 anchored to the inner wall of the bore 34 so that the contact member 9 is normally urged toward the opposite contact member 8 and the contact members 8 and 9 can conductively hold the stem portion of the photoflash lamp 4 therebetween when the lamp 4 is merely inserted in the socket 7. A conductive abutment strip 9a forming an integral extension of the contact member 9 extends from the rear end of the contact member 9 in a direction opposite to that of the resilient member 10 and is guided outwardly from the bore 34 of the socket structure 2. The conductive abutment strip 9a substantially makes a right angle with respect to the body of the contact member 9. A spring 11 has one end thereof anchored to the inner end of the socket 7 and has the other end thereof anchored to a lamp ejector 12 of electrically insulating material disposed between the contact members 8 and 9 so as to normally urge the lamp ejector 12 toward the open end of the socket 7.

Pivots 13 and 14 are firmly fixed on opposite end faces of the socket structure 2, with the pivot 13 journaled at the lower end thereof in a bearing 13a provided on the inner bottom wall of the casing 1, and the other pivot 14 which is made longer than the pivot 13 is arranged to project in loose fit relation into a central aperture of the rotary mounting structure 6 for mounting the flash cube 5 thereon. A coil spring 15 anchored at one end thereof to the socket structure 2 surrounds the longer pivot 14 and acts as a source of power for causing rotation of the rotary mounting structure 6 about the pivot 14. A recess 16 is suitably provided on the outer peripheral face of the socket structure 2 to serve as an engaging portion for the purpose as will be described later. A projection 36 extends from the outer peripheral face of the socket structure 2 to serve as means for actuating a switch. A stopper 37 extends from the bottom face of the socket structure 2 so as to limit the rotation of the socket structure 2 when the stopper 37 is abutted by a projection 38 upstanding from the inner bottom face of the casing 1.

On the other hand, a first conductive member 17 and a second conductive member 18 spaced apart a suitable distance from each other are fixed at one end thereof on the inner face of the casing 1 and have their free ends brought into contact with the outer periphery of the socket structure 2 under a suitable contact pressure. On the inner face of the casing 1 there is also provided a movable contact 43 of a switch $S_2$ (FIG. 10) disposed in a test circuit. When therefore the socket structure 2 is rotated about 90° counterclockwise, the free end of the first conductive member 17 is brought into contact with the extension 8a of the contact member 8 mounted on the outer end edge of the socket 7 and the free end of the second conductive member 18 is brought into contact with the conductive abutment strip 9a of the contact member 9. It will be further seen that, when the socket structure 2 is further rotated counter-clockwise through an angle of more than 90°, the switch actuating projection 36 urges the movable contact 43 of switch $S_2$ into contact with an opposite stationary contact 44 of switch $S_2$.

In the casing 1 of the flash lighting apparatus, a U-shaped lever 19 for limiting the rotary movement of the rotary mounting structure 6 and a combination stopper and lamp ejector actuator 20 of similarly U-like shape formed integrally with the lever 19 are rotatably mounted on a support pin 21 which is journaled at its lower end in a bearing 30. A resilient strip 18a forming an integral branch of the second conductive member 18 normally urges the rotary lever 19 and the combination stopper and lamp ejector actuator 20 in a counter-clockwise direction about the support pin 21 so that the lever 19 and the combination stopper and lamp ejector actuator 20 are urged into pressure contact with the outer periphery of the socket structure 2. Owing to such arrangement, an integral end strip 20a of the combination stopper and lamp ejector actuator 20 can engage the engaging portion 16 of the socket structure 2 when the socket structure 2 is rotated counter-clockwise. On the other hand, another integral end strip 20b of th ejector actuator 20 is normally abutted by the conductive abutment strip 9a of the conductive member 9.

A circular aperture 22 having a circular seat 23 therein is provided on the upper face of the casing 1, and the rotary mounting structure 6 is rotatably seated on the seat 23 in the aperture 22. The rotary mounting structure 6 has a plurality of slots 25 radially extending from a central bore for receiving therein corresponding radial projections 24 formed on the lower face of the flash cube 5. A limitedly rotatable structure 26 having a plurality of slots 22' radially extending from a central bore and aligningly communicating with the above slots 25 is integrally fitted in the bottom of the rotary mounting structure 6. This integral connection of these structures 26 and 6 is attained by a bottom aperture of the structure 6 and a land 46 of mating shape formed on the structure 26. The limitedly rotatable structure 26 has on its outer periphery four engaging lugs 27a, 27b, 27c and 27d radially extending in equally spaced relation and has on its lower part a cylindrical guide sleeve 28 loosely fitting on the longer pivot 14 of the socket structure 2, with the top end of the pivot 14 guided by the guide sleeve 28 passing through the central bore of the limitedly rotatable structure 26 and protruding in the central bore of the rotary mounting structure 6. The coil spring 15, whose one end is anchored to the socket structure 2, surrounds the guide sleeve 28 of the limitedly rotatable structure 26 and has the other end thereof anchored to the limitedly rotatable structure 26 so as to impart a driving power to the limitedly rotatable structure 26 and the rotary mounting structure 6. One radial lug 27d of the limitedly rotatable structure 26 has an upward extension 27' which extends a substantial height over the remaining three radial lugs 27a, 27b and 27c and acts to limit the rotation of the limitedly rotatable structure 26 when this extension 27' is abutted by a stopper 39 projecting downwardly from the upper inner face of the casing 1. Further, the rotary lever 19 formed integrally with the combination stopper and lamp ejector actuator 20 is provided with two integral end strips 19a and 19b which are disposed in a manner to embrace the limitedly rotatable structure 26. A push button 29 projecting outwardly through one side wall of the casing 1 is so disposed as to abut the end strip 20b of the combination stopper and lamp ejector actuator 20 so that depression of this push button 29 can cause swinging movement of the stopper and ejector actuator 20 and resultant swinging movement of the rotary lever 19 whereby the limitedly rotatable structure 26 can be rotated or held from rotation. One of the end strips 19a of the rotary lever 19 is made to a form of a hook for the purpose as will be described latetr. It will be seen that the flash cube 5 has four built-in photoflash lamps 31 and associated reflecting plates 32 directing toward four directions and the exterior of the cube 5 is covered by a transparent film 33. Leads 40 extend from each photoflash lamp 31 so that they can be brought into contact with contact strips 41 and 42 as the flash cube 5 is successively rotated.

The electrical circuit arrangement of the flash lighting apparatus of the invention having the structure as described above is generally similar to those of conventional flash lighting apparatus. As shown in FIG. 10, the electric circuit includes a source of power supply or battery 45, a resistor R, a synchronizing switch $S_1$ of a camera, a test lamp T, and the contact strips 41 and 42 for contact with the leads 40 of the photoflash lamp 31 in the flash cube 5. In the circuit, the first and second conductive members 17 and 18 are connected in parallel with the contact strips 41 and 42, a condenser C is connected in parallel with the battery 45, and the test switch $S_2$ is also connected in parallel with the synchronizing switch $S_1$. As described previously, the test switch $S_2$ includes the movable contact 43 and the stationary contact 44.

The operation of the flash lighting apparatus of the invention when used in combination with a single-flashing photoflash lamp will first be described hereunder.

The socket 7 of the socket structure 2 normally faces to the direction same as that of the opening of the casing 1 as shown in FIG. 1. Therefore the stem portion of the photoflash lamp 4 can be easily directed inserted into the socket 7 from the front side of the apparatus. By the insertion of the photoflash lamp 4 into the socket 7, the lamp ejector 12 is urged rearwardly against the force of the resilient member or spring 11 and the photoflash lamp 4 is secured in place with its stem portion firmly held between the two contact members 8 and 9. At the same time, leads derived outwardly on both sides of the stem portion of the photoflash lamp 4 are brought into contact with the associated contact members 8 and 9 to complete the electrical connection at the socket structure 2. FIG. 5 shows the state in which the photoflash lamp 4 is being inserted into the socket 7.

The photoflash lamp 4 mounted in this manner is gripped and then turned through an angle of about 90° in a direction as shown by arrow in FIG. 6. In the state shown in FIG. 6, the end strip 20a of the combination stopper and lamp ejector actuator 20 engages the engaging portion 16 formed on the socket structure 2 so that the socket structure 2 is held in its rotated position and the photoflash lamp 4 comes to a position opposite the reflecting surface of the reflecting plate 3. Under this state, the extension 8a of the contact member 8 and the conductive abutment strip 9a of the contact member 9 of the socket structure 2 are brought into contact with the first conductive member 17 and the second conductive member 18, respectively, and thus actuation of the switch $S_1$ connects the photoflash lamp 4 to the power supply 45 to cause emission of a flash of light from the photoflash lamp 4. During the time in which the socket structure 2 is being rotated in the direction of arrow so as to bring the photoflash lamp 4 to the position opposite the reflecting plate 3, the limitedly rotatable structure 26 having the upper end of the coil spring 15 anchored thereto is held from any rotation because of the fact that the upward extension 27' of the radial lug 27d is abutted by the stopper 39 and the hook-shaped end strip 19a of the rotary lever 19 is in engagement with another radial lug 27b. Thus a force corresponding to the amount of rotation of the socket structure 2 can be accumulated in the coil spring 15 when the socket structure 2 is rotated in the direction of arrow in FIG. 6.

After ignition of the photoflash lamp 4 to give a flash of light, the push button 29 may be depressed to cause pivotal movement of the stopper and lamp ejector actuator 20 against the resiliency of the resilient strip 18a of the second conductive member 18 for thereby urging the end strip 20a away from its engaged position in the engaging portion 16 of the socket structure 2. The socket structure 2 is therefore rotated through an angle of about 90° in a direction opposite to the arrow in FIG. 6 to be restored to its original position by the force accumulated in the coil spring 15. By further depression of the push button 29, the other end strip 20b of the stopper and lamp ejector actuator 20 urges the conductive abutment strip 9a of the contact member 9 so that the contact member 9 is swung in a direction away from the other contact member 8 against the force of the resilient member 10. Since in this situation there is no more force holding the stem portion of the photoflash lamp 4 in place, the lamp ejector 12 urged by the spring 11 discharges the used photoflash lamp 4 outwardly of the socket 7. During the above return movement of the socket structure 2 by the depression of the push button 29, the rotary lever 19 integral with the combination stopper and lamp ejector actuator 20 is also caused to rotate against the force of the resilient strip 18a so that the hook-shaped end strip 19a is disengaged from the radial lug 27b of the limitedly rotatable structure 26, but this limitedly rotatable structure 26 is still held from rotation due to the fact that its radial lug 27d is abutted by the stopper 39.

When it is desired to make sure of satisfactory ignitability of the photoflash lamp 4, the photoflash lamp 4 may be further pushed rearwardly to a position as shown by chain lines in FIG. 6 to thereby cause further rotation of the socket structure 2. By so rotating, the projection 36 on the opposite side of the socket 7 in the socket structure 2 forces the movable contact 43 of switch $S_2$ into contact with the opposite stationary contact 44 by which the test lamp T (FIG. 10) is energized or lit if the photoflash lamp 4 is a good lamp and is not energized if the lamp 4 is a faulty lamp.

It will be understood that by the repetition of the above operation single-flashing photoflash lamps 4 can be successively mounted on the flash lighting apparatus to give successive flashes of light as required.

The operation of the flash lighting apparatus of the invention when used in combination with a flash cube will next be described hereunder.

At first, the flash cube 5 is mounted on the rotary mounting structure 6 with the radial projections 24 of the former engaged in the aligned radial slots 25 and 22' of the rotary mounting structure 6 and the limitedly rotatable structure 26. Then the flash cube 5 thus mounted is gripped by hand and is rotated clockwise from the state as shown in FIG. 7. As the rotary mounting structure 6 is rotated in this direction, the radial lugs 27a, 27d and 27c of the limitedly rotatable structure 26 successively kick the hook-shaped end strip 19a of the rotary lever 19, and finally a time is reached at which further clockwise rotation of the rotary mounting structure 6 is no more possible because the upward extension 27' of the radial lug 27d is abutted by the stopper 39. By this clockwise rotation of the rotary mounting structure 6, the coil spring 15 is wound to impart to the rotary mounting structure 6 and the limitedly rotatable structure 26 a tendency to rotate in the counter-clockwise direction. When in such situation the gripping force on the flash cube 5 is released, the uncoiling force of the coil spring 15 urges the flash cube 5 to slightly rotate to a position in which it is stopped by the engagement between the radial lug 27c and the hook-shaped end strip 19a as shown in FIG. 8. During the above rotary movement of the rotary mounting structure 6 in the clockwise direction, the other end strip 19b of the rotary lever 19 may be urged inwardly into the space between the adjacent radial lugs 27 each time every one of the radial lugs 27a, 27d and 27c kicks the hook-shaped end strip 19a, but this end strip 19b would not obstruct the pivotal movement of the rotary lever 19 because the free end of the end strip 19b takes its sufficiently outwardly remote position when the radial lugs 27a, 27d and 27c are at positions at which they do not kick the hook-shaped end strip 19a. Closure of the synchronizing switch $S_1$ at the position of the apparatus as shown in FIG. 8 can effect emission of a first flash of light from one of the photoflash lamps 31 in the flash cube 5.

Subsequent depression of the push button 29 can cause pivotal movement of the rotary lever 19 and resultant rotation of the rotary mounting structure 6 in the manner as described hereunder. When the push button 29 is depressed in the state of the apparatus as shown in FIG. 8, the rotary lever 19 makes its clockwise pivotal movement about the support pin 21 against the resiliency of the resilient strip 18a with the result that the radial lug 27c is disengaged from the hook-shaped end strip 19a and the rotary mounting structure 6 is rotated counter-clockwise by the uncoiling force of the coil spring 15. Since under such situation the end strip 19b of the rotary lever 19 is urged to its inward position, the free end of the end strip 19b engages the radial lug 27a, as shown in FIG. 9, to temporarily stop the rotation of the rotary mounting structure 6. Then when the pressure imparted to the push button 29 is released, the rotary lever 19 swings back to its original position to allow for rotation of the rotary mounting structure 6, which therefore rotates until the radial lug 27d of the limitedly rotatable structure 26 is engaged by the hook-shaped end strip 19a and is stopped thereat. The flash cube 5 is rotated 90° from the position of FIG. 8 by the above operation so that a new photoflash lamp 31 can now be directed in the predetermined direction to give a second flash of light in response to actuation of the synchronizing switch $S_1$.

The flash cube 5 is further rotated in like manner through an angle of 90° by subsequent depression of the push button 29 to stop at position and still further rotated through another angle of 90° by depression of the push button 29 to return to the original state as shown in FIG. 7 showing the first mounted position of the flash cube 5 on the flash lighting apparatus. During the above operation, the flash cube 5 has rotated through 270° and thus every photoflash lamps 31 disposed on the four sides of the flash cube 5 have been successively directed in the predetermined direction to give successive flashes of light.

Simultaneous ignition of one of the photoflash lamps 31 of the flash cube 5 and a single-flashing photoflash lamp 4 can be effected by mounting the flash cube 5 on the rotary mounting structure 6 and by mounting the single-flashing photoflash lamp 4 in the socket 7 of the socket structure 2 and by then turning the photoflash lamp 4 to the position at which it is opposed by the reflecting plate 3. In this case, depression of the push button 29 can simultaneously effect change-over of the flash lighting face in the flash cube 5 and discharge of the used photoflash lamp 4.

From the foregoing description it will be understood that the present invention can attain marked effects over the prior art apparatus. The first effest resides in that use of an expensive but remarkably easily operable flash cube and an economical single-flashing photoflash lamp can be arbitrarily selected by a photographer. The flash lighting apparatus according to the invention is very convenient for a user because it not only permits use of an expensive flash cube but also permits use of an inexpensive single-flashing photoflash lamp in taking photographs and because simultaneous ignition of the photoflash lamp in the flash cube and the single-flashing photoflash lamp can be effected if the amount of light by the single lamp is insufficient for proper exposure. The second effect resides in that mere depression of the push button can effect automatic return of the socket structure to its original position and automatic discharge of a used photoflash lamp from the socket of the socket structure, thus permitting ready mounting of a new photoflash lamp on the socket structure. The third effect resides in easy and positive rotation of the flash cube by a simple manipulation. More precisely, when the rotary structure causing rotation of the flash cube is urged in one direction by the force of the coil spring, the end strip of the rotary lever is engaged by one of the lugs of the rotary structure to temporarily stop the rotary movement of the rotary structure so that the adjacent lug of the rotary structure is necessarily engaged by the hook-shaped end strip of the rotary lever when the pressure imparted to the push button is released. Therefore there is utterly no possibility that one actuation of the push button causes change-over of two or more flash lighting faces of the flash cube at a time and one flash lighting face of the flash cube is always positively directed in a predetermined direction by one actuation of the push button. Moreover the flash lighting apparatus of the invention is quite easy to operate since mere manipulation of the push button can accomplish the desired function.

What is claimed is:

1. A flash lighting apparatus for photography comprising a box-shaped casing having an open end; a reflecting plate disposed in said opening; a first flash lighting section disposed in said opening, said first flash lighting section including a socket structure rotatably disposed in said opening and having on its outer peripheral face a socket for mounting thereon a single-flashing photoflash lamp; and a second flash lighting section disposed on one side face of said casing, said second flash lighting section including a rotary mounting structure having a socket for mounting thereon a flash cube and arranged to be rotated to a plurality of predetermined angular positions in an intermittent fashion.

2. A flash lighting apparatus for photography comprising a box-shaped casing having an open end; a reflecting plate disposed in said opening; a first flash lighting section disposed in said opening, said first flash lighting section including a socket structure rotatably disposed in said opening and having on its outer peripheral face an engaging portion and a socket for mounting thereon a single-flashing photoflash lamp by holding the stem portion of the single-flashing photoflash lamp between opposite contact members, and a combination stopper and lamp ejector actuator disposed for operation in interengaged relation with depression of a push button, said first flash lighting section being operative in a manner that said socket structure is locked in position by engagement of said engaging portion and said combination stopper and lamp ejector actuator when said socket structure is rotated to a position at which the single-flashing photoflash lamp mounted on said socket structure is brought opposite to said reflecting plate and the operation of said combination stopper and lamp ejector actuator in response to depression of said push button after emission of a flash of light by the photoflash lamp unlocks said socket structure to return it to its original position, said combination stopper and lamp ejector actuator being further operative in response to further depression of said push button to release the lamp holding pressure by the contact members for thereby discharging the used photoflash lamp; and a second flash lighting section disposed on one side face of said casing, said second flash lighting section including a rotary mounting structure having a socket for mounting thereon a flash cube and arranged to be rotated to a plurality of predetermined angular positions in an intermittent fashion.

3. A flash lighting apparatus for photography comprising a box-shaped casing having an open end; a reflecting plate disposed in said opening; a first flash lighting section disposed in said opening, said first flash lighting section including a socket structure rotatably disposed in said opening and having on its outer peripheral face a socket for mounting thereon a single-flashing photoflash lamp; and a second flash lighting section disposed on one side face of said casing, said second flash lighting section including a rotary structure for mounting thereon a flash cube normally urged in a predetermined direction and having on its outer periphery a plurality of equally spaced radial lugs whose number is equal to that of photoflash lamps accommodated in the flash cube, and a rotary lever pivotally disposed in said casing in a manner that it is normally urged in one direction and its pivotal movement is controlled by actuation of a push button, said rotary lever having at one end thereof a hook-like end strip adapted for engagement with the radial lugs of said rotary structure and having at the other end thereof a projecting strip engageable with the radial lugs of said rotary structure for temporarily stopping the rotation of said rotary structure.

4. A flash light apparatus for photography comprising a box-shaped casing having an open end; a reflecting plate disposed in said opening; a first flash lighting section disposed in said opening, said first flash lighting section including a socket structure rotatably disposed in said opening and having on its outer peripheral face an engaging portion and a socket for mounting thereon a single-flashing photoflash lamp by holding the stem portion of the single-flashing photoflash lamp between opposite contact members, and a combination stopper and lamp ejector actuator disposed for operation in interengaged relation with depression of a push button, said first flash lighting section being operative in a manner that said socket structure is locked in position by engagement of said engaging portion and said combination stopper and lamp ejector actuator when said socket structure is rotated to a position at which the single-flashing photoflash lamp mounted on said socket structure is brought opposite to said reflecting plate and the operation of said combination stopper and lamp ejector actuator in response to depression of said push button after emission of a flash of light by the photoflash lamp unlocks said socket structure to return it to its original position, said combination stopper and lamp ejector actuator being further operative in response to further depression of said push button to release the lamp holding pressure by the contact members for thereby discharging the used photoflash lamp; and a second flash lighting section disposed on one side face of said casing, said second flash lighting section including a rotary structure for mounting thereon a flash cube normally urged in a predetermined direction and having on its outer periphery a plurality of equally spaced radial lugs whose number is equal to that of photoflash lamps accommodated in the flash cube, and a rotary lever pivotally disposed in said casing in a manner that it is normally urged in one direction and its pivotal movement is controlled by actuation of said push button, said rotary lever having at one end thereof a hook-like end strip adapted for engagement with the radial lugs of said rotary structure and having at the other end thereof a projecting strip engageable with the radial lugs of said rotary structure for temporarily stopping the rotation of said rotary structure.

5. A flash lighting apparatus for photography comprising a box-shaped casing having an open end; a reflecting plate disposed in said opening; a socket structure rotatably disposed in said opening in juxtaposition with said reflecting plate; a pair of contact members mounted in said socket structure for forming a socket for a single-flashing photoflash lamp, one of said contact members having one end thereof extended outwardly of said socket structure and suitably bent to form an abutment strip while at the same time being pivotally disposed and normally urged toward the opposite contact member; a lamp ejector interposed between said contact members and normally urged outwardly away from said socket structure; a limitedly rotatable structure having on its outer periphery a plurality of radial lugs and rotatably mounted on a pivot extending upwardly from the upper face of said socket structure; a coil spring fitted on said pivot and having both ends thereof anchored to said socket structure and said limitedly rotatable structure; a rotary mounting structure for mounting thereon a flash cube, said rotary mounting structure being integrally secured to said limitedly rotatable structure; a pair of conductive members fixed to said casing at one end thereof and having their free ends disposed adjacent to the outer periphery of said socket structure so that they are contacted by said pair of contact members when said socket structure is rotated to a position at which the photoflash lamp mounted thereon is brought opposite to said reflecting plate; a switch means adapted to be actuated by the rotation of said socket structure to form a conductivity test circuit for the flash lamp; a combination stopper and lamp ejector actuator disposed in said casing so as to detachably engage with an engaging portion formed on said socket structure for thereby limiting the rotation of said socket structure and arranged to be abutted by said abutment strip of said contact member on said socket structure for thereby urging said contact members away from each other; and a rotary lever pivotally disposed in said casing in coaxial relation with said combination stopper and lamp ejector actuator and normally urged in one direction together with the latter, said rotary lever having an engaging strip detachably engageable with the radial lugs of said limitedly rotatable structure for permitting rotation of said limitedly rotatable member through a predetermined angle at a time.

References Cited

UNITED STATES PATENTS

| | | | |
|---|---|---|---|
| 3,335,651 | 8/1967 | Williams et al. | 95—11 |
| 3,353,467 | 11/1967 | Ernisse et al. | 95—11.5 |

FOREIGN PATENTS

| | | |
|---|---|---|
| 1,161,121 | 1/1964 | Germany. |
| 1,185,914 | 1/1965 | Germany. |

NORTON ANSHER, *Primary Examiner.*

FRED L. BRAUN, *Assistant Examiner.*

U.S. Cl. X.R.

95—11; 240—37.1